(12) United States Patent
Mahnad

(10) Patent No.: US 8,036,088 B1
(45) Date of Patent: Oct. 11, 2011

(54) OPTICAL TAPE DRIVE MOVABLE PLANARIZER SUBSYSTEM AND METHOD FOR MINIMIZING DAMAGE TO AN OPTICAL PICKUP UNIT

(75) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 12/814,810

(22) Filed: Jun. 14, 2010

(51) Int. Cl.
*G11B 7/00* (2006.01)
(52) U.S. Cl. ......... 369/97; 369/93; 369/44.14; 369/47.1
(58) Field of Classification Search .................. None
See application file for complete search history.

(56) References Cited

U.S. PATENT DOCUMENTS

| 7,369,483 B2* | 5/2008 | Slafer et al. | 369/275.4 |
| 7,826,169 B2* | 11/2010 | Saliba et al. | 360/77.12 |

* cited by examiner

*Primary Examiner* — Muhammad N Edun
(74) *Attorney, Agent, or Firm* — Brooks Kushman P.C.

(57) ABSTRACT

In an optical tape drive system, a movable planarizer subsystem includes a tape planarizer support structure for supporting an optical tape planarizer. The support structure is moveable between an operational position and a non-operational position. The movable planarizer subsystem also includes an actuator for moving the support structure and the optical tape planarizer between the operational position and the non-operational position. The operational position of the support structure positions the optical tape planarizer to permit reading/writing of information from/to an optical tape via an optical pickup unit (OPU), and the non-operational position of the support structure positions the optical tape planarizer to permit passage of a tape leader though the tape drive system without damage to the OPU.

20 Claims, 6 Drawing Sheets

OPTICAL TAPE DRIVE MOVABLE PLANARIZER SUBSYSTEM AND METHOD FOR MINIMIZING DAMAGE TO AN OPTICAL PICKUP UNIT

TECHNICAL FIELD

The following relates to a planarizing support apparatus for positioning an optical tape media in front of an optical pickup unit (OPU) in an optical tape drive system.

BACKGROUND

For optimal performance, an optical recording system requires an optical tape drive with an electro-mechanical tape transport subsystem that provides precise positioning and planarizing of a moving tape media in front of the Optical Pickup Unit (OPU). Precise positioning and planarizing of the tape media ensures accurate focusing and tracking operations of the objective lens of the OPU.

However, optical head objective lens focusing specifications dictate stringent proximity requirements for media and OPU placements. This makes the design and operation of the coupling leaders (tape buckles) of the tape supply reel and the take-up reel difficult. Such difficulty arises from the relatively large dimensions of the tape leaders with respect to the spacing requirements of the optical media and OPU lens focusing distance. In that regard, passage of large dimension tape leaders through the tape transport subsystem can cause damage to the OPU due to the proximity of the optical tape and OPU required for optimal performance of the optical recording system.

As a result, there exists a need for an electro-mechanical tape transport subsystem in an optical recording system that overcomes such a problem. Such a tape transport subsystem would reduce the possibility of damage to the OPU due to tape leader passage through the subsystem, while still providing the precise positioning and planarizing of the tape media in front of the OPU to ensure optimal performance of the optical recording system.

SUMMARY

According to one embodiment disclosed herein, in an optical tape drive system, a movable planarizer subsystem is provided. The movable planarizer subsystem comprises a tape planarizer support structure for supporting an optical tape planarizer, where the support structure is rotatable between an operational position and a non-operational position. The movable planarizer subsystem further comprises a rotatable shaft fixedly attached to the tape planarizer support structure, and an actuator for rotating the rotatable shaft, thereby rotating the support structure and the optical tape planarizer between the operational position and the non-operational position. The operational position of the support structure positions the optical tape planarizer to permit reading/writing of information from/to an optical tape via an optical pickup unit (OPU). The non-operational position of the support structure positions the optical tape planarizer to permit passage of a tape leader though the tape drive system without damage to the OPU.

According to another embodiment, in an optical tape drive system, a movable planarizer subsystem is provided comprising a tape planarizer support structure for supporting an optical tape planarizer, where the support structure is movable between an operational position and a non-operational position, and an actuator for moving the support structure and the optical tape planarizer between the operational position and the non-operational position. The operational position of the support structure positions the optical tape planarizer to permit reading/writing of information from/to an optical tape via an optical pickup unit (OPU), and the non-operational position of the support structure positions the optical tape planarizer to permit passage of a tape leader though the tape drive system without damage to the OPU.

According to a further embodiment, in an optical tape drive system, a method for minimizing damage to an optical pickup unit (OPU) is provided. The method comprises moving a tape planarizer support structure supporting an optical tape planarizer to an operational position, wherein the operational position of the support structure positions the optical tape planarizer to permit reading/writing of information from/to an optical tape via the OPU. The method further comprises moving the tape planarizer support structure to a non-operational position, wherein the non-operational position of the support structure positions the optical tape planarizer to permit passage of an optical tape leader though the tape drive system without damage to the OPU.

A detailed description of these embodiments and accompanying drawings is set forth below.

DETAILED DESCRIPTION

Figure 1:
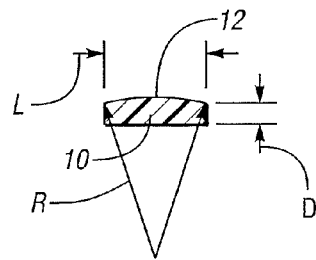
FIG. 1 is a cross-sectional view of an exemplary front surface element for use in an embodiment of a movable tape planarizer subsystem disclosed herein.

With reference to FIGS. 1-7, a movable tape planarizer subsystem for use in an optical tape drive system and a method for minimizing damage to an Optical Pickup Unit in an optical tape drive system will be described. For ease of illustration and to facilitate understanding, like reference numerals have been used herein for like components and features throughout the drawings.

Referring first to FIG. 1, a cross-sectional view is shown of an exemplary front surface element (10) for use in an embodiment of a movable tape planarizer subsystem disclosed herein. As seen in FIG. 1, the front surface element (10) may be provided with a length, L, of 4 mm and a depth, D, of 0.5 to 1.5 mm. The front surface element (10) has a support surface (12) which may be provided with a radius, R, of 6.5 to 9.5 mm. Front surface element (10) may be manufactured from highly polished Alumina or other type of ceramic material in any fashion known in the art.

Figure 2A:
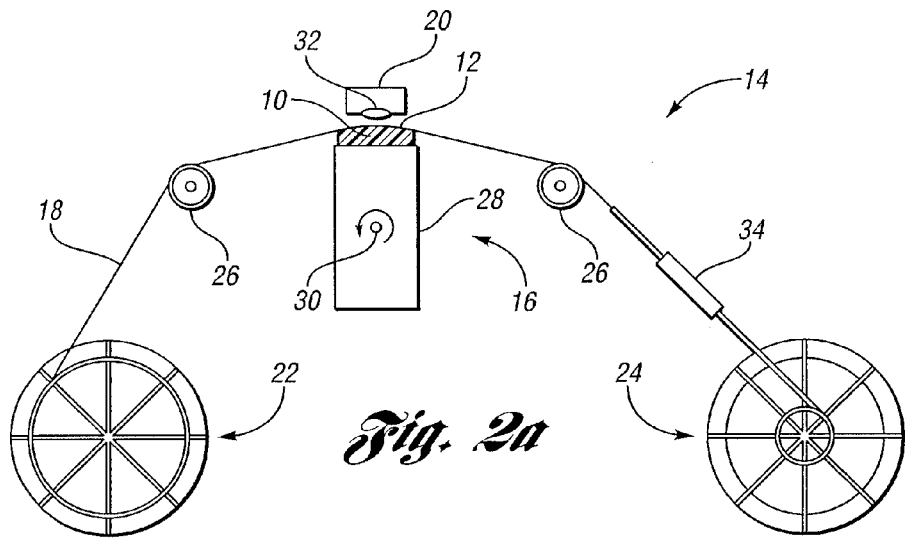
FIG. 2a is a top view of one embodiment of an optical tape transport subsystem having a movable tape planarizer positioned for normal read and write operations.
Figure 2B:
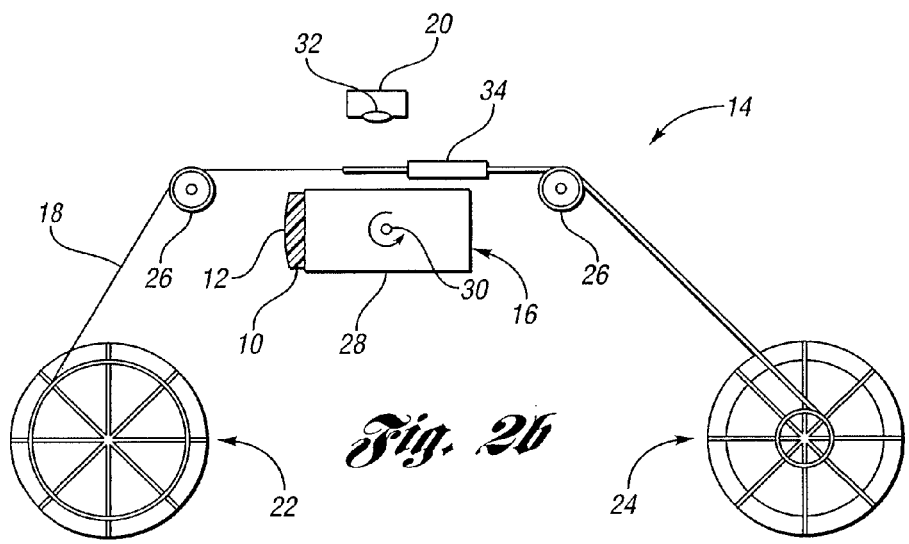
FIG. 2b is a top view of the embodiment of an optical tape transport subsystem of FIG. 2a having the movable tape planarizer positioned for tape loading and unloading operations.

FIG. 2a depicts a top view of one embodiment of an optical tape transport subsystem (14) having a movable tape planarizer (16) positioned for normal read and write operations. FIG. 2b is a top view of the embodiment of an optical tape transport subsystem (14) of FIG. 2a having the movable tape planarizer (16) positioned for tape loading and unloading operations. As seen therein, a tape media (18) is supported and moved past an Optical Pickup Unit (OPU) (20) by supply and take-up reels (22, 24), as well as guide rollers (26).

As shown in FIGS. 2a and 2b, the movable tape planarizer (16) comprises a front surface element (10) (see FIG. 1) mounted on a planarizer support structure (28), which itself may be mounted on a rotatable shaft (30). This rotatable structure makes it possible, via an actuator (not shown), to move the planarizing support surface (12) (see FIG. 1) to either a first or operational position in front of and proximate an objective lense (32) of the OPU (20) to enable read and write operations (see FIG. 2a), or to a second or non-operation position spaced away from the OPU (20) to permit safe passage of a tape leader (34) through the optical tape drive system, such as during loading and unloading of the tape media (18), without the tape leader (34) causing damage to the OPU (20) (see FIG. 2b).

It should be noted that while shown and described herein as rotatable, the planarizer support structure (28) may alternatively be movable between operational and non-operational positions in other fashions. For example, in addition to or instead of rotational movement, the planarizer support structure (28) may be configured for cooperation with an actuator to provide for linear motion of the planarizer support structure (28) relative to the OPU (20) sufficient to increase the gap or spacing between the front surface element (10) and the OPU (20) from that required to enable read and write operations to one sufficient to permit safe passage of the tape leader (34) through the optical tape drive system, such as during loading and unloading of the tape media (18), without the tape leader (34) causing damage to the OPU (20).

To facilitate rotational motion of the planarizer support structure (28), the rotating shaft (30) or the body of the support structure (28) may be connected to a rotor of a bistable rotary actuator. In that regard, FIGS. 3a-d are simplified diagrams of a bistable rotary actuator (36) for use in embodiments of a movable tape planarizer subsystem disclosed herein. Bistable rotary actuator (36) may comprise a permanent magnet rotor (38), a ferromagnetic stator housing (40), stop bars (42) and a coil winding (44). FIGS. 3a-d depict energized and/or de-energized conditions of the rotary actuator (36) and the resulting positions of the rotor (38) relative to the stator (40).

Figure 3A:
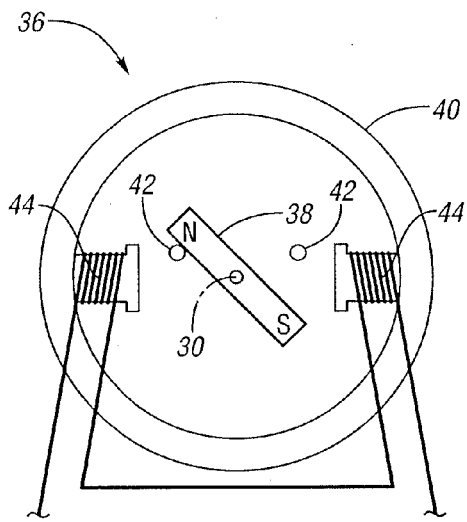
FIGS. 3a-d are simplified diagrams of a bistable rotary actuator for use in embodiments of a movable tape planarizer subsystem disclosed herein, where energized and de-energized positions of the actuator rotor are shown relative to a stator.
Figure 3B:
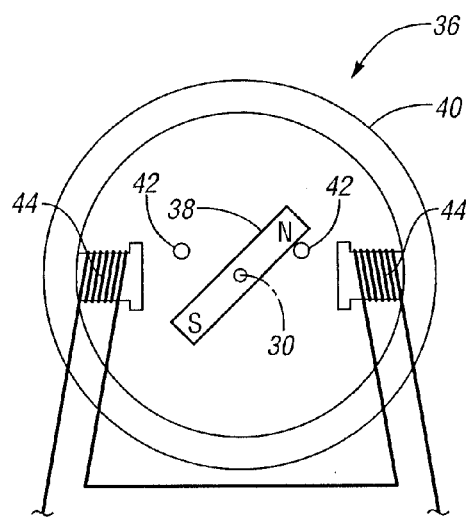

More specifically, as seen in FIGS. 3a and 3b, two alternative stable positions of the rotor (38) caused by the magnetic action between the magnetic rotor (38) and the ferromagnetic stator housing (40) are constrained by a set of stop bars (42) installed 90° apart either internal or external to the stator housing (40). With no electrical current applied to the coil (44) of the stator housing (40) of the actuator (36), the rotor (38) remains stationary at these stable positions.

Figure 3C:
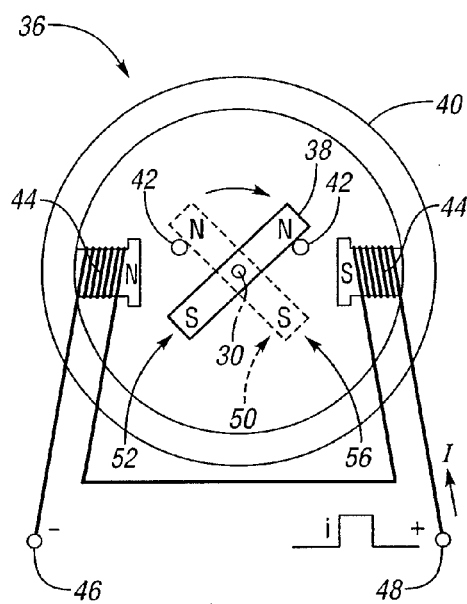
Figure 3D:
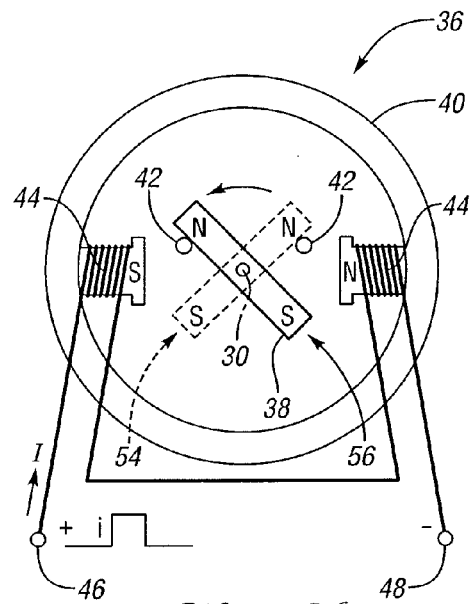

As seen in FIGS. 3c and 3d, by applying an adequate magnitude pulse of current, i, to the coil winding (44) of stator (40), the rotor (38) either remains at one of the stable positions or moves to the other stable position, depending upon the direction of pulsed current, i. For example, as shown in FIG. 3c, by applying a pulsed current across coil (44) from terminal (48) to terminal (46), rotor (38) is moved from stable position (50) to position (52). In another example, shown in FIG. 3d, by applying a pulsed current in the opposite direction across coil (44) from terminal (46) to terminal (48), rotor (38) is moved from stable position (54) to position (56).

Figure 4A:
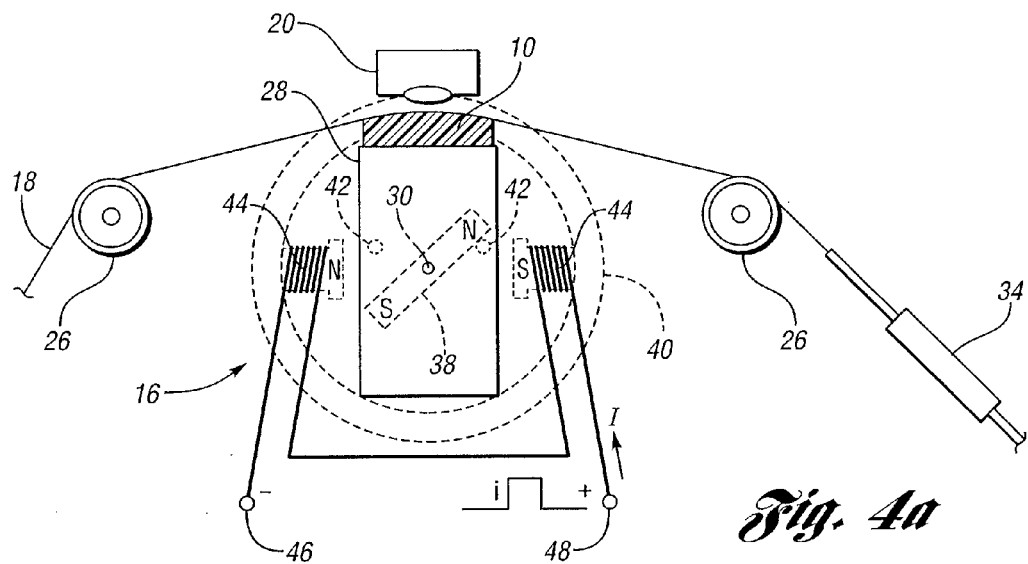
FIG. 4a is a top view of one embodiment of an optical tape transport subsystem having a movable tape planarizer with a bistable rotary actuator as depicted in FIGS. 3a-d and positioned for normal read and write operations.
Figure 4B:
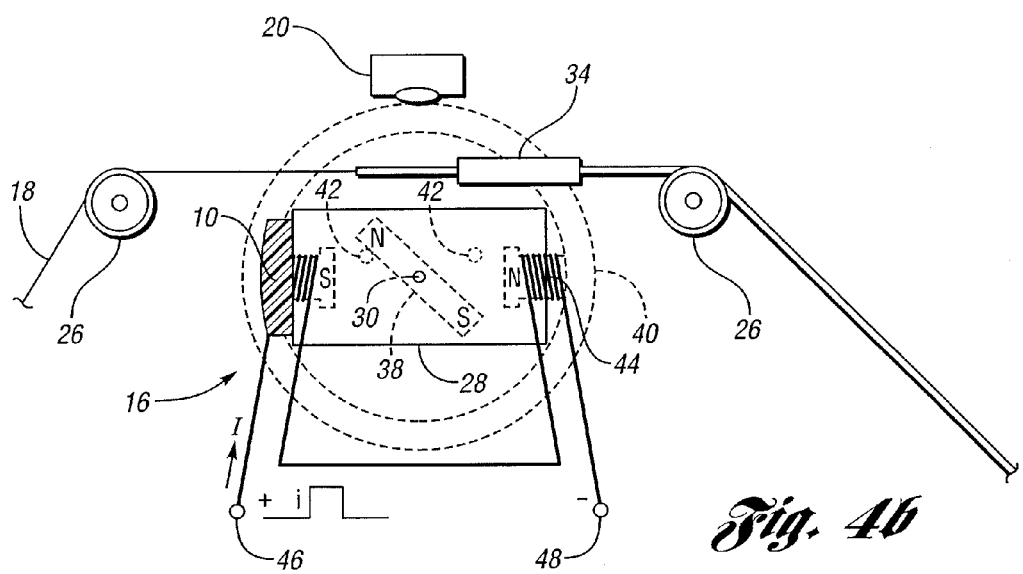
FIG. 4b is a top view of the embodiment of an optical tape transport subsystem of FIG. 4a having a movable tape planarizer with a bistable rotary actuator as depicted in FIGS. 3a-d and positioned for tape loading and unloading operations.

Referring now to FIGS. 4a and 4b, FIG. 4a depicts a top view of one embodiment of an optical tape transport subsystem with a movable tape planarizer (16) having a bistable rotary actuator (36) of a type depicted in FIGS. 3a-d and positioned for normal read and write operations. FIG. 4b depicts a top view of the embodiment of an optical tape transport subsystem of FIG. 4a with the movable tape planarizer (16) having a bistable rotary actuator (36) and positioned for tape loading and unloading operations.

As seen therein, the tape planarizer support structure (28) of the rotatable tape planarizer (16) is connected to the rotor (38) of the bistable rotary actuator (36). In that regard, the moving portions of the two mechanisms may be rigidly or fixedly attached or connected to each other through a shaft in order to couple the motion thereof. As a result, by applying a pulse of current in the appropriate direction, as described in detail above in connection with FIGS. 3a-d, the movable tape planarizer (16) may be moved to an operational position in front of and proximate to the OPU (20) to enable read and/or write operations (see FIG. 4a), or to a non-operational position spaced away from the OPU (20) to permit passage of the tape leader (34) without causing damage to the OPU (20) (see FIG. 4b).

Figure 5A:
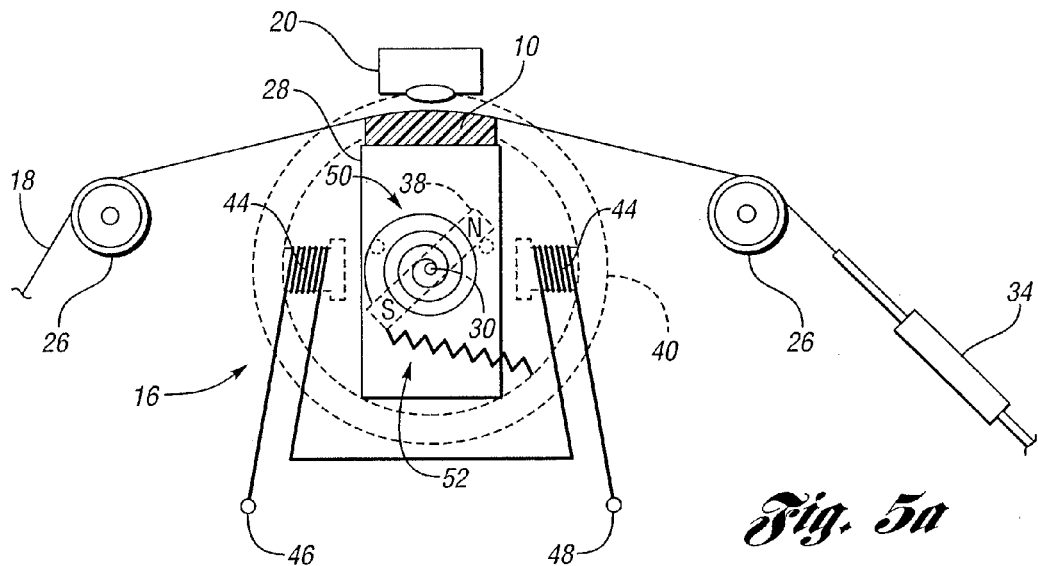
FIG. 5a is a top view of another embodiment of an optical tape transport subsystem having a movable tape planarizer with a bistable rotary actuator as depicted in FIGS. 3a-d together with a spring mechanism, the movable tape planarizer positioned for normal read and write operations.
Figure 5B:
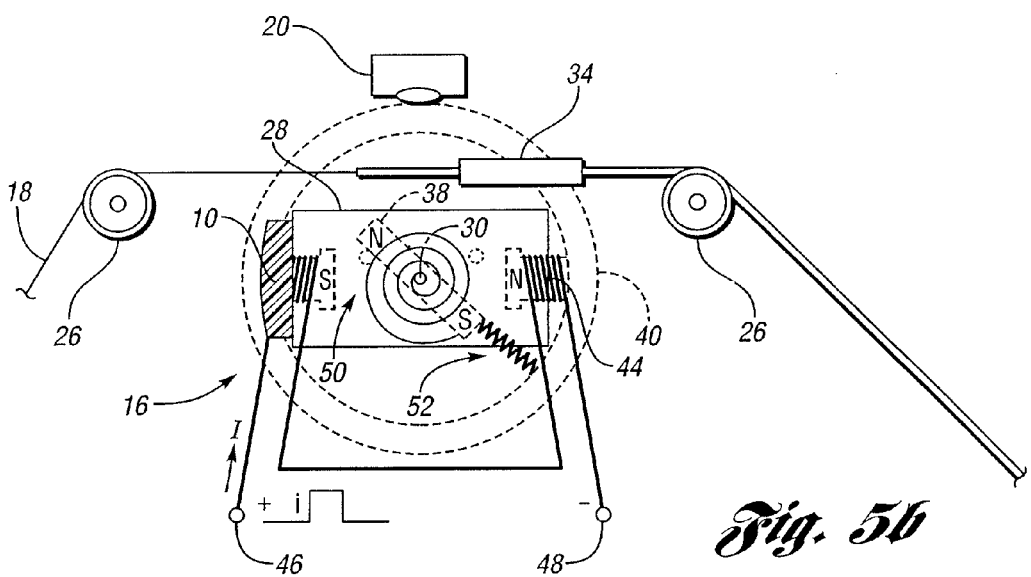
FIG. 5b is a top view of the embodiment of an optical tape transport subsystem of FIG. 5a having a movable tape planarizer with a bistable rotary actuator as depicted in FIGS. 3a-d together with a spring mechanism, the movable tape planarizer positioned for tape loading and unloading operations.

With reference to FIGS. 5a and 5b, FIG. 5a shows a top view of another embodiment of an optical tape transport subsystem (14) having a movable tape planarizer (16) with a bistable rotary actuator (36) as depicted in FIGS. 3a-d together with a spring mechanism (50 and/or 52), the movable tape planarizer (16) positioned for normal read and write operations. FIG. 5b depicts a top view of the embodiment of an optical tape transport subsystem (14) of FIG. 5a having a movable tape planarizer (16) with a bistable rotary actuator (36) as depicted in FIGS. 3a-d together with a spring mechanism (50 and/or 52), the movable tape planarizer (16) positioned for tape loading and unloading operations.

As seen therein, a mechanical spring may be utilized to hold the rotor (38) of the actuator (36) in a position that places the movable tape planarizer (16) in an operational position in front of and proximate to the OPU (20) to enable read and/or write operations (FIG. 5a). The mechanical spring may be a rotary spring (50), a straight spring (52), or any other type of spring known in the art.

Applying appropriate continuous current to the coil (44) moves the tape planarizer (16) to a non-operational position spaced away from the OPU (20) for safe passage of the tape leader (34) past the OPU (20), such as during the loading and upon unloading of the tape media (18) (FIG. 5b). It should also be noted that a simple latching mechanism (not shown) or additional electromagnetic force can be applied to further stabilize the position of the movable tape planarizer (16) in the operational position in front of and proximate to the OPU (20) for read and/or write operations.

Figure 6A:
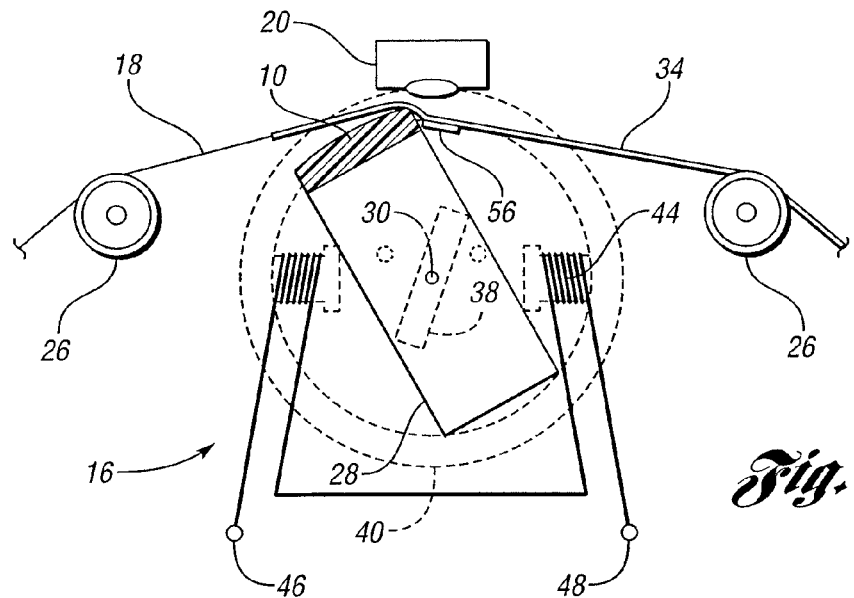
FIG. 6a is a top view of another embodiment of an optical tape transport subsystem having a movable tape planarizer with a bistable rotary actuator as depicted in FIGS. 3a-d and positioned for normal read and write operations.
Figure 6B:
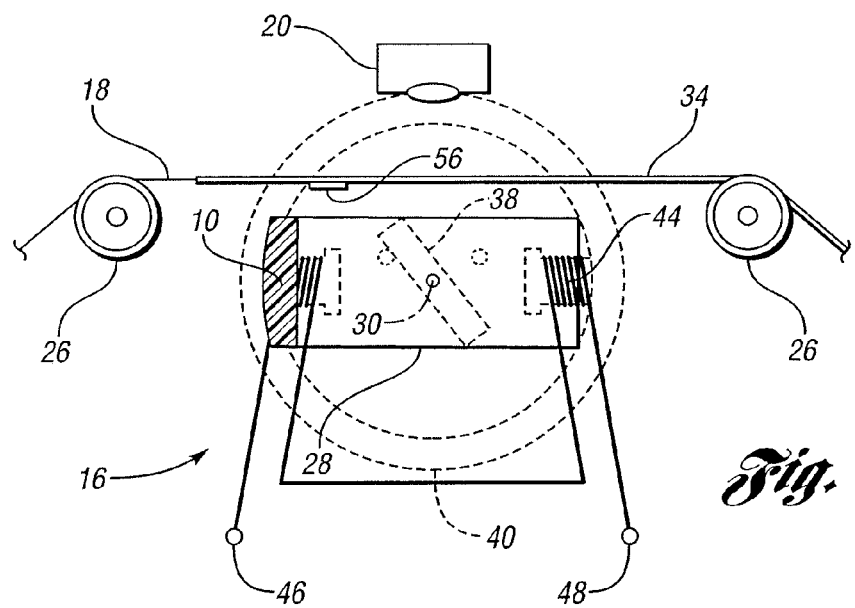
FIG. 6b is a top view of the embodiment of an optical tape transport subsystem of FIG. 6a having a movable tape planarizer with a bistable rotary actuator as depicted in FIGS. 3a-d and positioned for tape loading and unloading operations.

Referring next to FIGS. 6a and 6b, FIG. 6a is a top view of another embodiment of an optical tape transport subsystem (14) having a movable tape planarizer (16) with a bistable rotary actuator (36) as depicted in FIGS. 3a-d and positioned for normal read and write operations. FIG. 6b is a top view of the embodiment of an optical tape transport subsystem (14) of FIG. 6a having a movable tape planarizer (16) with a bistable rotary actuator (36) as depicted in FIGS. 3a-d and positioned for tape loading and unloading operations.

The embodiment depicted in FIGS. 6a and 6b incorporates a failsafe mechanism to minimize damage to the OPU (20) from the tape leader (34) in cases of power failure or tape runaway. For example, in the case of power loss during normal tape motion operation, the back-electromotive force (back-EMF) of the tape drive spindle motor (not shown) may be used to energize the stator (40) in order to move the tape planarizer (16) toward the non-operational safe position spaced away from the OPU (20), thereby permitting passage of the tape leader (34) without damage to the OPU (20).

In that same regard, as seen in FIGS. 6a and 6b, the tape leader (34) may be provided with a pin (56). The front surface element (10) or the planarizer support structure (28) of the rotatable tape planarizer (16) may be provided with an edge configured to contact the pin (56) of the tape leader (34) as the tape leader (34) passes the OPU (20). Such mechanical coupling of the pin (56) of the tape leader (34) and the edge of the front surface element (10) or the planarizer support structure (28) as the tape leader (34) approaches the OPU (20) (see FIG. 6a) forces rotation of the movable tape planarizer (16) from the operational position in front of and proximate the OPU (20) where read and/or write operations are enabled toward the non-operational position spaced away from the OPU (20) (see FIG. 6b), thereby allowing safe passage of the tape leader (34) without damaging the OPU (20).

Figure 7:
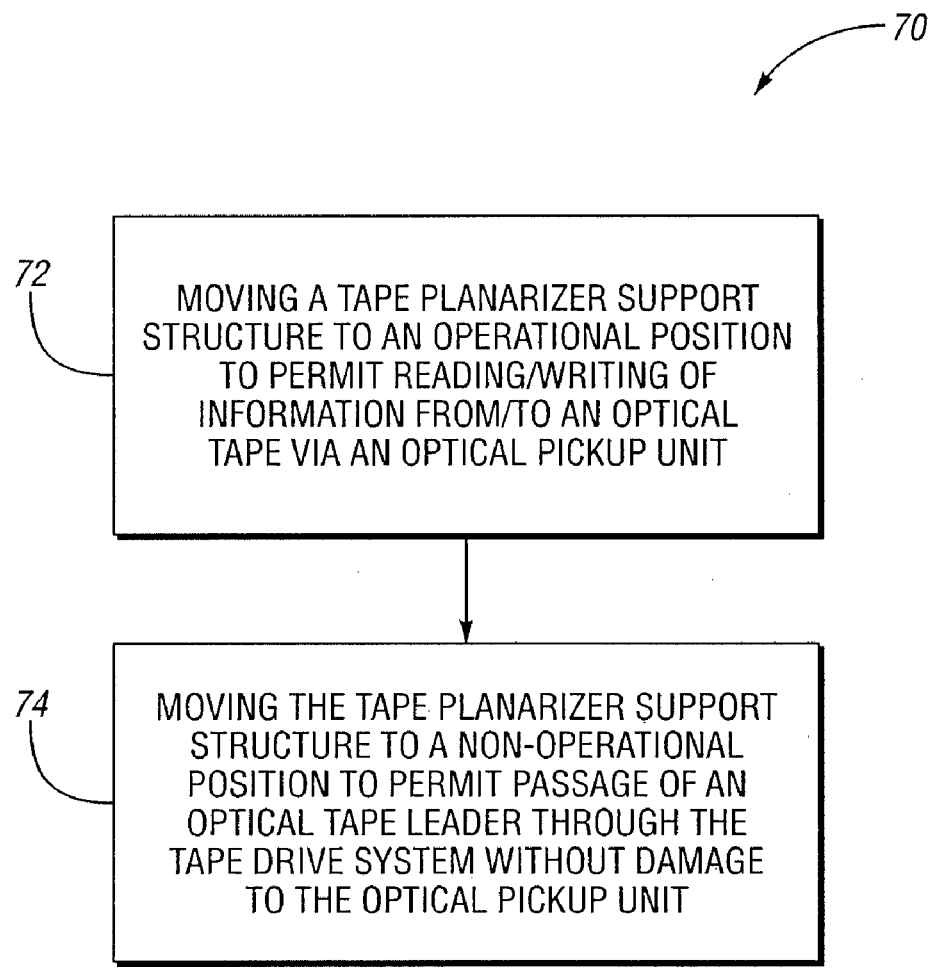
FIG. 7 is a simplified flowchart depicting an embodiment of a method disclosed herein for minimizing damage to an optical pickup unit in an optical tape drive system.

Referring now to FIG. 7, a simplified flowchart depicting an embodiment of a method (70) disclosed herein for minimizing damage to an Optical Pickup Unit (OPU) in an optical tape drive system is shown. As seen therein, the method (70) comprises moving (72) a tape planarizer support structure supporting an optical tape planarizer to an operational position. The operational position of the support structure positions the optical tape planarizer to permit reading/writing of information from/to an optical tape via the OPU.

The method (70) for minimizing damage to an Optical Pickup Unit (OPU) further comprises moving (74) the tape planarizer support structure to a non-operational position. The non-operational position of the support structure positions the optical tape planarizer to permit passage of an optical tape leader though the tape drive system without damage to the OPU.

In that regard, as previously described above in connection with FIGS. 2-6, moving (72, 74) the tape planarizer support structure to the operational and non-operational positions may comprise energizing and de-energizing a coil winding of a magnetic stator configured for operation with a permanent magnet rotor in a bi-stable rotary actuator. The rotor cooperates with the tape planarizer support structure such that rotation of the rotor provides rotational movement of the tape planarizer support structure between the operational and non-operational positions.

Similarly, moving (72, 74) the tape planarizer support structure to the operational and non-operational positions may comprise energizing a coil winding of a stator with first and second currents, where the is stator configured for operation with a permanent magnet rotor, again in a bi-stable rotary actuator. Once again, the rotor cooperates with the tape planarizer support structure such that rotation of the rotor provides rotational movement of the tape planarizer support structure between the operational and non-operational positions.

As is readily apparent from the foregoing description, a movable tape planarizer for use in a tape transport subsystem in an optical recording system has been disclosed that reduces the possibility of damage to an Optical Pickup Unit (OPU) in an optical tape drive due to tape leader passage through the drive. As well, the movable tape planarizer continues to provide the precise positioning and planarizing of the tape media in front of the OPU to ensure optimal performance of the optical recording system.

While certain embodiments of a movable tape planarizer and a method for minimizing damage to an optical pickup unit in an optical tape drive system have been illustrated and described herein, they are exemplary only and are not intended to illustrate and/or describe all those possible. Rather, the words used herein are words of description rather than limitation, and it is understood that various changes may be made without departing from the spirit and scope of the following claims.

What is claimed is:

1. In an optical tape drive system, a movable planarizer subsystem comprising:
    a tape planarizer support structure for supporting an optical tape planarizer, the support structure rotatable between an operational position and a non-operational position;
    a rotatable shaft fixedly attached to the tape planarizer support structure; and
    an actuator for rotating the rotatable shaft, thereby rotating the support structure and the optical tape planarizer between the operational position and the non-operational position;
    wherein the operational position of the support structure positions the optical tape planarizer to permit reading/writing of information from/to an optical tape via an optical pickup unit (OPU), and wherein the non-operational position of the support structure positions the optical tape planarizer to permit passage of a tape leader though the tape drive system without damage to the OPU.

2. The movable planarizer subsystem of claim 1 wherein the actuator comprises a bi-stable rotary actuator, the rotary actuator comprising:
    a rotor comprising a permanent magnet; and
    a stator comprising a magnetic material and having a coil winding;
    wherein the rotor has a first position relative to the stator when the coil winding is energized with a current, and wherein the rotor has a second position relative to the stator when the coil winding is de-energized, the first rotor position corresponding to one of the operational and non-operational positions of the tape planarizer support structure, and the second rotor position corresponding to another one of the operational and non-operational positions of the tape planarizer support structure.

3. The movable planarizer subsystem of claim 2 wherein the bi-stable rotary actuator further comprises a spring for biasing the rotor toward one of the first and second rotor positions.

4. The movable planarizer subsystem of claim 2 wherein the bi-stable rotary actuator further comprises a stop for halting rotation of the rotor at one of the first and second rotor positions.

5. The movable planarizer subsystem of claim 2 wherein the tape drive system includes a spindle motor, and wherein back electro-magnetic force of the spindle motor may be used to energize the stator coil winding in the event of power loss.

6. The movable planarizer subsystem of claim 1 wherein the actuator comprises a bi-stable rotary actuator, the rotary actuator comprising:
   a rotor comprising a permanent magnet; and
   a stator having a coil winding;
   wherein the rotor has a first position relative to the stator when the coil winding is energized with a first current, and wherein the rotor has a second position relative to the stator when the coil winding is energized with a second current, the first rotor position corresponding to one of the operational and non-operational positions of the tape planarizer support structure, and the second rotor position corresponding to another one of the operational and non-operational positions of the tape planarizer support structure.

7. The movable planarizer subsystem of claim 6 wherein the bi-stable rotary actuator further comprises a spring for biasing the rotor toward one of the first and second rotor positions.

8. The movable planarizer subsystem of claim 6 wherein the bi-stable rotary actuator further comprises a stop for halting rotation of the rotor at one of the first and second rotor positions.

9. The movable planarizer subsystem of claim 6 wherein the tape drive system includes a spindle motor, and wherein back electro-magnetic force of the spindle motor may be used to energize the stator coil winding in the event of power loss.

10. The movable planarizer subsystem of claim 1 wherein the optical tape planarizer has an edge configured to contact a pin provided on the tape leader, wherein contact between the tape leader pin and the tape planarizer edge rotates the support structure from the operational position toward the non-operational position.

11. In an optical tape drive system, a movable planarizer subsystem comprising:
   a tape planarizer support structure for supporting an optical tape planarizer, the support structure moveable between an operational position and a non-operational position; and
   an actuator for moving the support structure and the optical tape planarizer between the operational position and the non-operational position;
   wherein the operational position of the support structure positions the optical tape planarizer to permit reading/writing of information from/to an optical tape via an optical pickup unit (OPU), and wherein the non-operational position of the support structure positions the optical tape planarizer to permit passage of a tape leader though the tape drive system without damage to the OPU.

12. The movable planarizer subsystem of claim 11 wherein the actuator comprises a bi-stable rotary actuator, the rotary actuator comprising:
   a rotor comprising a permanent magnet; and
   a stator comprising a magnetic material and having a coil winding;
   wherein the rotor has a first position relative to the stator when the coil winding is energized with a current, and wherein the rotor has a second position relative to the stator when the coil winding is de-energized, the first rotor position corresponding to one of the operational and non-operational positions of the tape planarizer support structure, and the second rotor position corresponding to another one of the operational and non-operational positions of the tape planarizer support structure.

13. The movable planarizer subsystem of claim 12 wherein the bi-stable rotary actuator further comprises a spring for biasing the rotor toward one of the first and second rotor positions.

14. The movable planarizer subsystem of claim 12 wherein the tape drive system includes a spindle motor, and wherein back electro-magnetic force of the spindle motor may be used to energize the stator coil winding in the event of power loss.

15. The movable planarizer subsystem of claim 11 wherein the actuator comprises a bi-stable rotary actuator, the rotary actuator comprising:
   a rotor comprising a permanent magnet; and
   a stator having a coil winding;
   wherein the rotor has a first position relative to the stator when the coil winding is energized with a first current, and wherein the rotor has a second position relative to the stator when the coil winding is energized with a second current, the first rotor position corresponding to one of the operational and non-operational positions of the tape planarizer support structure, and the second rotor position corresponding to another one of the operational and non-operational positions of the tape planarizer support structure.

16. The movable planarizer subsystem of claim 15 wherein the bi-stable rotary actuator further comprises a stop for halting rotation of the rotor at one of the first and second rotor positions.

17. The movable planarizer subsystem of claim 11 wherein the optical tape planarizer has an edge configured to contact a pin provided on the tape leader, wherein contact between the tape leader pin and the tape planarizer edge rotates the support structure from the operational position toward the non-operational position.

18. In an optical tape drive system, a method for minimizing damage to an optical pickup unit (OPU), the method comprising:
   moving a tape planarizer support structure supporting an optical tape planarizer to an operational position, wherein the operational position of the support structure positions the optical tape planarizer to permit reading/writing of information from/to an optical tape via the OPU; and
   moving the tape planarizer support structure to a non-operational position, wherein the non-operational position of the support structure positions the optical tape planarizer relative to the OPU to permit passage of an optical tape leader though the tape drive system without damage to the OPU.

19. The method of claim 18 wherein moving the tape planarizer support structure to the operational and non-operational positions comprises energizing and de-energizing a coil winding of a magnetic stator configured for operation with a permanent magnet rotor, the rotor cooperating with the tape planarizer support structure.

20. The method of claim 18 wherein moving the tape planarizer support structure to the operational and non-operational positions comprises energizing a coil winding of a stator with first and second currents, the stator configured for operation with a permanent magnet rotor, the rotor cooperating with the tape planarizer support structure.

* * * * *